United States Patent
Ferdowsi et al.

(10) Patent No.: US 11,949,582 B2
(45) Date of Patent: *Apr. 2, 2024

(54) DEVICE CLUSTERING

(71) Applicant: Snap Inc., Santa Monica, CA (US)

(72) Inventors: Zahra Ferdowsi, Marina del Rey, CA (US); Michael Cieslak, Los Angeles, CA (US); Michael David Marr, Monroe, WA (US); Aysegul Cansizoglu, Los Angeles, CA (US); Xiaolin Shi, Santa Monica, CA (US); Hussein Mehanna, Los Gatos, CA (US); Caleb Ogden, Highland, UT (US); Yi Xu, Pasadena, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/731,719

(22) Filed: Apr. 28, 2022

(65) Prior Publication Data

US 2022/0255833 A1   Aug. 11, 2022

Related U.S. Application Data

(63) Continuation of application No. 16/398,426, filed on Apr. 30, 2019, now Pat. No. 11,343,160.

(51) Int. Cl.
| | |
|---|---|
| *H04L 43/55* | (2022.01) |
| *H04L 41/0893* | (2022.01) |
| *H04L 41/50* | (2022.01) |
| *H04L 67/1087* | (2022.01) |
| *H04L 67/125* | (2022.01) |

(52) U.S. Cl.
CPC .......... *H04L 43/55* (2022.05); *H04L 41/0893* (2013.01); *H04L 41/5096* (2013.01); *H04L 67/1091* (2013.01); *H04L 67/125* (2013.01)

(58) Field of Classification Search
CPC . H04L 43/55; H04L 41/0893; H04L 41/5096; H04L 67/1091; H04L 67/125; H04L 43/0817
See application file for complete search history.

(56) References Cited

U.S. PATENT DOCUMENTS

| | | | |
|---|---|---|---|
| 11,343,160 | B1 | 5/2022 | Ferdowsi et al. |
| 2012/0317266 | A1 | 12/2012 | Abbott |
| 2014/0310387 | A1 | 10/2014 | Kamal et al. |
| 2016/0057041 | A1 | 2/2016 | Gupta et al. |
| 2017/0060654 | A1 | 3/2017 | Nandakumar et al. |
| 2018/0227210 | A1 | 8/2018 | Cosgrove |
| 2018/0331883 | A1* | 11/2018 | Bonanni ............. H04L 67/1038 |
| 2019/0082033 | A1 | 3/2019 | Tak et al. |

* cited by examiner

*Primary Examiner* — Abdulkader M Alriyashi
(74) *Attorney, Agent, or Firm* — Culhane Meadows PLLC; Stephen J. Weed

(57) ABSTRACT

Clustering a plurality of client devices running an application as a function of a data structure such that the plurality of client devices are each assigned a cluster. Client devices having similar performance metrics are assigned the same cluster. An operation of the application is modified as a function of the performance metrics of the client device. The modification of application operation is performed by turning certain features of the application on and off using a rule based on device cluster.

19 Claims, 8 Drawing Sheets

202

| Device Model | WAU | Cluster |
|---|---|---|
| Device 1 | Quantity A | A |
| Device 2 | Quantity B | A |
| Device 3 | Quantity C | A |
| | Quantity D | A |
| | Quantity E | A |
| | Quantity F | B |
| | Quantity G | B |
| | Quantity H | B |
| | Quantity I | B |
| | Quantity J | B |
| | Quantity K | C |
| | Quantity L | C |
| | Quantity M | C |
| | Quantity N | C |
| ⋮ | Quantity O | C |
| ⋮ | Quantity P | D |
| | Quantity Q | D |
| | Quantity R | D |
| | Quantity S | D |
| | Quantity T | D |
| | Quantity U | E |
| | Quantity V | E |
| | Quantity W | E |
| | Quantity X | E |
| | Quantity Y | E |
| | Quantity Z | F |
| | Quantity AA | F |
| | Quantity AB | F |
| | Quantity AC | F |
| Device N | Quantity AD | F |

FIG. 4

| Cluster | # Devices | WAU (m) | WNU (m) | Camera Creation Delay Image(s) | Camera Creation Delay Video(s) | Crash Rate | G2S Cold(s) | G2S Warm(s) | Lens Init Delay | Recording Delay Image(s) | Image Capture to Preview Image(s) | Image Capture to Preview Video | Swipe Latency |
|---|---|---|---|---|---|---|---|---|---|---|---|---|---|
| 0 | a | h | p | x | ad | aj | ap | av | bb | bh | bn | bt | bz |
| 1 | b | i | q | y | ae | ak | aq | aw | bc | bi | bo | bu | ca |
| 2 | c | j | r | z | af | al | ar | ax | bd | bj | bp | bv | cb |
| 3 | d | k | s | aa | ag | am | as | ay | be | bk | bq | bw | cc |
| 4 | e | l | t | ab | ah | an | at | az | bf | bl | br | bx | cd |
| 5 | f | m | u | ac | ai | ao | au | ba | bg | bm | bs | by | ce |
| Unclassified | g | n | v | | | | | | | | | | |
| % of All with Cluster | | o | w | | | | | | | | | | |

DEVICE CLUSTERING

CROSS-REFERENCE TO RELATED APPLICATIONS

This application is a Continuation of U.S. application Ser. No. 16/398,426 filed on Apr. 30, 2019, the contents of which are incorporated fully herein by reference.

TECHNICAL FIELD

The present disclosure generally relates to performance metrics of an application operable on various client devices.

BACKGROUND

Performance metrics of an application, conventionally referred to as an app, that runs on a client device vary from device to device. There are currently over 25K client devices operable on the Android® platform, and over 60 client devices operable on the iOS® platform. The performance of the application can vary based on a plurality of parameters including both hardware and software.

Latency is one of the notable metrics and can adversely affect the performance of an application to the point where the application is slow or even unresponsive which impacts the user's engagement.

BRIEF DESCRIPTION OF THE DRAWINGS

In the drawings, which are not necessarily drawn to scale, like numerals may describe similar components in different views. Like numerals having different letter suffixes may represent different instances of similar components. Some examples are illustrated by way of example, and not limitation, in the figures of the accompanying drawings in which:

FIG. 4 is an example of data structure comprising a device list showing the top 5 client devices in each cluster 0 through 5 based on WAU;

FIG. 5 illustrates a data structure comprising a performance metric chart showing average performance metrics for client devices of each cluster 0 through 5;

DETAILED DESCRIPTION

Figure 1:
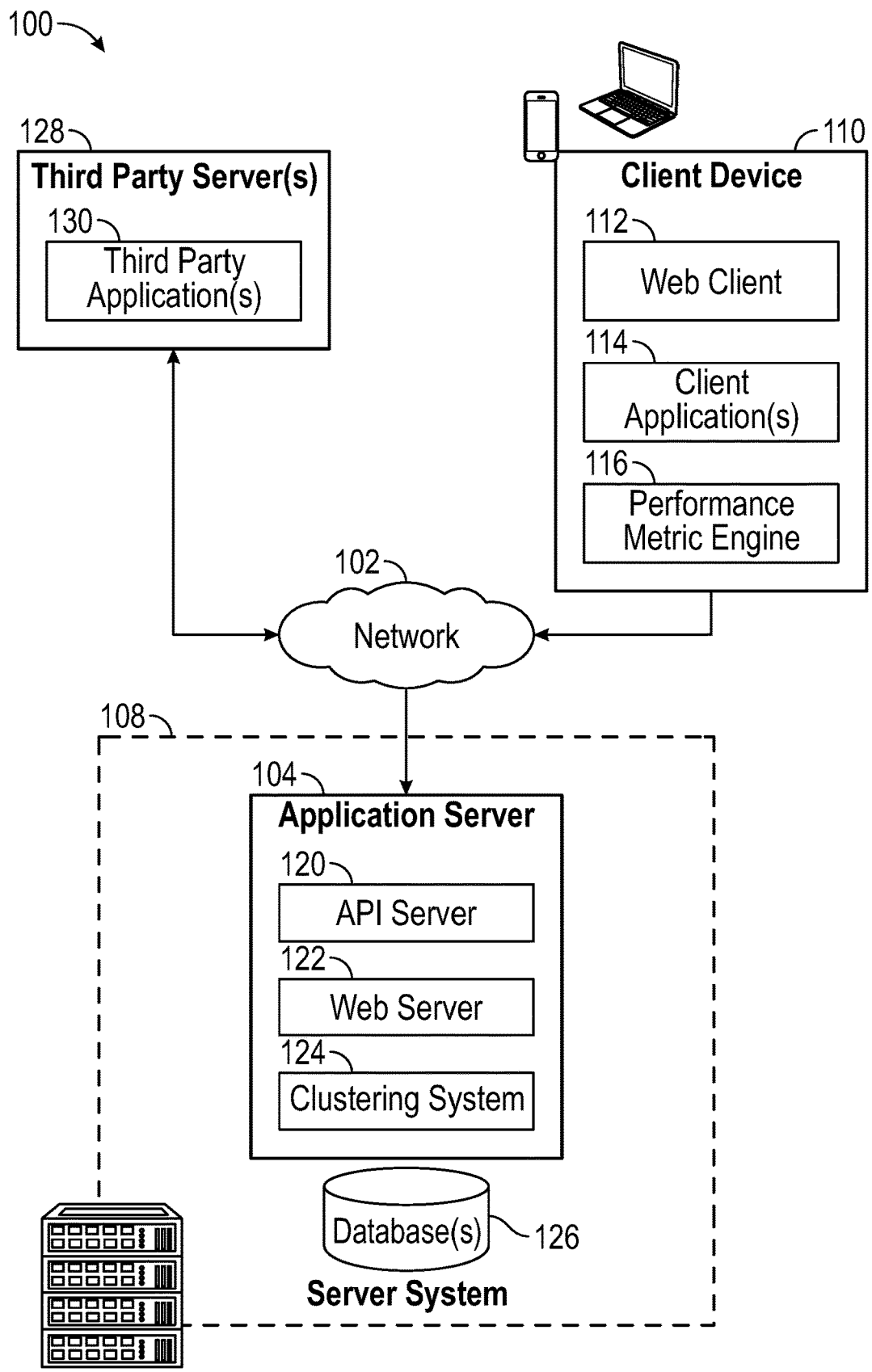
FIG. 1 is a block diagram showing an example of clustering client devices having similar performance metrics system over a network.

The description that follows includes systems, methods, techniques, instruction sequences, and computing machine program products illustrative of examples of the disclosure. In the following description, for the purposes of explanation, numerous specific details are set forth in order to provide an understanding of various examples of the disclosed subject matter. It will be evident, however, to those skilled in the art, that examples of the disclosed subject matter may be practiced without these specific details. In general, well-known instruction instances, protocols, structures, and techniques are not necessarily shown in detail.

One aspect of the present disclosure describes a system for landscaping various client devices by clustering client devices into clusters based on similar performance metrics. In an example, the cluster can range from 0 to 5, where a cluster 0 includes the least performant devices and cluster 5 includes flagship devices. The clustering is an off-line process that is performed using actual client devices during workloads when a user engages an application running on a client device. The performance metrics are functional in that they relate to a user using and engaging the application running on the client device, and the performance metrics do not depend on a network. The performance metrics are stored and dynamically updated in a server system based on aggregated performance data. Performance data of the application is aggregated over time for each of the client devices, and lists ranking the various client devices are maintained at a server system. Charts are also maintained that include the performance metrics of client devices. New client devices that come available are combined with a clustering list based on how close their performance metrics are to the centroid of clusters. The top client devices are based on WAU and WNU, and some are based on expert opinion.

For example, performance characteristics, in order of importance, can include elapsed time from tapping on the app icon to being able to capture an image (cold/warm), camera creation delay (image/video), crash rate, image capture to preview delay, camera recording delay, lens initiation delay, and lens swipe latency. For latency metrics, the 90 percentile (p90) is selected and data from the first 3 days after launch may be excluded because of performance metric instability.

The clustering helps understand the effects of features/launches on Android device tiers and iOS tiers, provides a better track of performance metrics, helps focus engineering resources on the right client devices, provide feature gating, and get a more diverse/representative phones for quality assurance (QA).

Example uses of clustering is performing data analysis on feature releases. For instance, when new features are released, the clustering can determine how the feature changes user engagement of the client device in each device cluster. Clustering also helps improve a user experience.

Another example use of clustering is to analyze performance metrics over time, such as a year, and between upgrades. For example, the latency for using certain features of an application on a client device is analyzed. Since users are always upgrading their phones to higher end devices, issues in performance metrics might be masked by this automatic improvement in performance metrics for users who upgrade. So is important to monitor the performance metrics on each cluster over time to make sure new features have not made the app slower for users who have been using the same device over time.

Another example use of clustering is turning certain features on and off in clusters. An example is determining a maps feature takes too much power in client devices of cluster 0 and 1. Using a rule, the maps feature on a client device is not enabled when using an application on devices of cluster 0 and 1 and remains enabled on devices of clusters 2-5.

Another example is to aggregate performance metrics to eliminate unique phones that are usually in the low-power mode.

Details of the clustering is provided below.

FIG. 1 is a block diagram illustrating a system 100, according to some examples, configured to automatically perform clustering of client devices operable by a user. The system 100 includes one or more client devices such as client device 110. The client device 110 includes, but is not limited to, a mobile phone, desktop computer, laptop, portable digital assistants (PDA), smart phone, tablet, ultra-book, netbook, laptop, multi-processor system, microprocessor-based or programmable consumer electronic, game console, set-top box, computer in a vehicle, or any other communication device that a user may utilize to access the system 100. In some examples, the client device 110 includes a display module (not shown) to display information (e.g., in the form of user interfaces). In further examples, the client device 110 includes one or more of touch screens, accelerometers, gyroscopes, cameras, microphones, global positioning system (GPS) devices, and so forth. The client device 110 may be a device of a user that is used to access and utilize an online social platform.

For example, client device 110 is a device of a given user who uses an application 114 on an online social platform. Client device 110 accesses a website of an online social platform hosted by a server system 108. The user inputs login credentials associated with the user. Server system 108 receives the request and provides access to the online social platform.

A user of the client device 110 launches and engages an application 114 hosted by the server system 108. The client device 110 has a performance engine 116 including a MicroKernel in client code performing the observation or calculation of performance metrics on the client device 110. The performance engine 116 downloads the performance metrics to the server system 108 without significantly affecting operation of the application 114 and are used to perform clustering of the client device.

One or more users may be a person, a machine, or other means of interacting with the client device 110. In examples, the user may not be part of the system 100 but may interact with the system 100 via the client device 110 or other means. For instance, the user may provide input (e.g., touch screen input or alphanumeric input) to the client device 110 and the input may be communicated to other entities in the system 100 (e.g., third-party servers 130, server system 108, etc.) via the network 102. In this instance, the other entities in the system 100, in response to receiving the input from the user, may communicate information to the client device 110 via the network 102 to be presented to the user. In this way, the user interacts with the various entities in the system 100 using the client device 110.

The system 100 further includes a network 102. One or more portions of network 102 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WiFi network, a 4G LTE network, another type of network, or a combination of two or more such networks.

The client device 110 may access the various data and applications provided by other entities in the system 100 via web client 112 (e.g., a browser) or one or more client applications 114. The client device 110 may include one or more client application(s) 114 (also referred to as "apps") such as, but not limited to, a web browser, messaging application, electronic mail (email) application, an e-commerce site application, a mapping or location application, an online home buying and selling application, a real estate application, and the like.

In some examples, one or more client application(s) 114 are included in a given one of the client device 110, and configured to locally provide the user interface and at least some of the functionalities, with the client application(s) 114 configured to communicate with other entities in the system 100 (e.g., third-party server(s) 128, server system 108, etc.), on an as-needed basis, for data processing capabilities not locally available (e.g., to access location information, to authenticate a user, etc.). Conversely, one or more client application(s) 114 may not be included in the client device 110, and then the client device 110 may use its web browser to access the one or more applications hosted on other entities in the system 100 (e.g., third-party server(s) 128, server system 108, etc.).

A server system 108 provides server-side functionality via the network 102 (e.g., the Internet or wide area network (WAN)) to: one or more third-party server(s) 128, and one or more client devices 110. The server system 108 includes an application server 104 including an application program interface (API) server 120, a web server 122, and a clustering system 124, that may be communicatively coupled with one or more database(s) 126. The one or more database(s) 126 may be storage devices that store data related to users of the server system 108, applications associated with the server system 108, cloud services, housing market data, and so forth. The one or more database(s) 126 may further store information related to third-party server(s) 128, third-party application(s) 130, client device 110, client application(s) 114, users, and so forth. In one example, the one or more database(s) 126 may be cloud-based storage.

The server system 108 may be a cloud computing environment, according to some examples. The server system 108, and any servers associated with the server system 108, may be associated with a cloud-based application, in one example.

The server system 108 includes a clustering system 124. Clustering system 124 may include one or more servers and may be associated with a cloud-based application. Clustering system 124 obtains performance metrics associated with operating application 114 on the client device 110 from performance engine 116. The details of the clustering system 124 are provided below in connection with FIG. 2, and the details of the performance engine are provided below in connection with FIG. 3.

The system 100 further includes one or more third-party server(s) 128. The one or more third-party server(s) 128 may include one or more third-party application(s) 130. The one or more third-party application(s) 130, executing on third-party server(s) 128 may interact with the server system 108 via API server 120 via a programmatic interface provided by the API server 120. For example, one or more the third-party applications 132 may request and utilize information from the server system 108 via the API server 120 to support one or more features or functions on a website hosted by the third-party or an application hosted by the third-party. The third-party application(s) 130, for example, may provide software version analysis functionality that is supported by relevant functionality and data in the server system 108.

Figure 2:
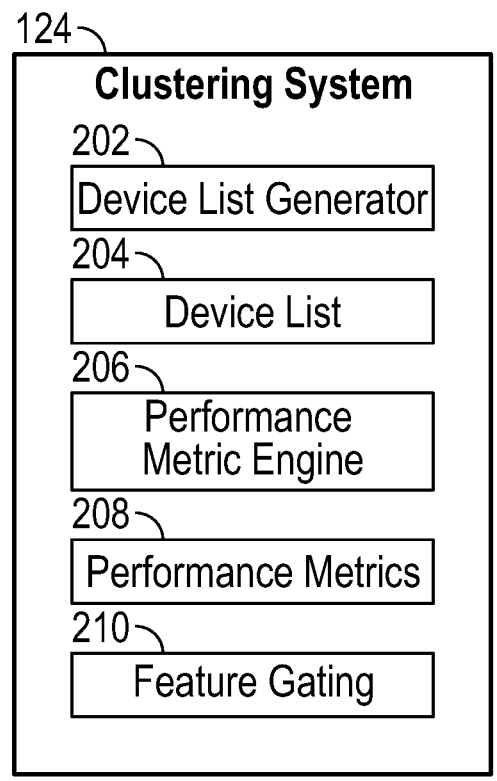
FIG. 2 is a block diagram illustrating a clustering system operable within a server system.
Figure 9:
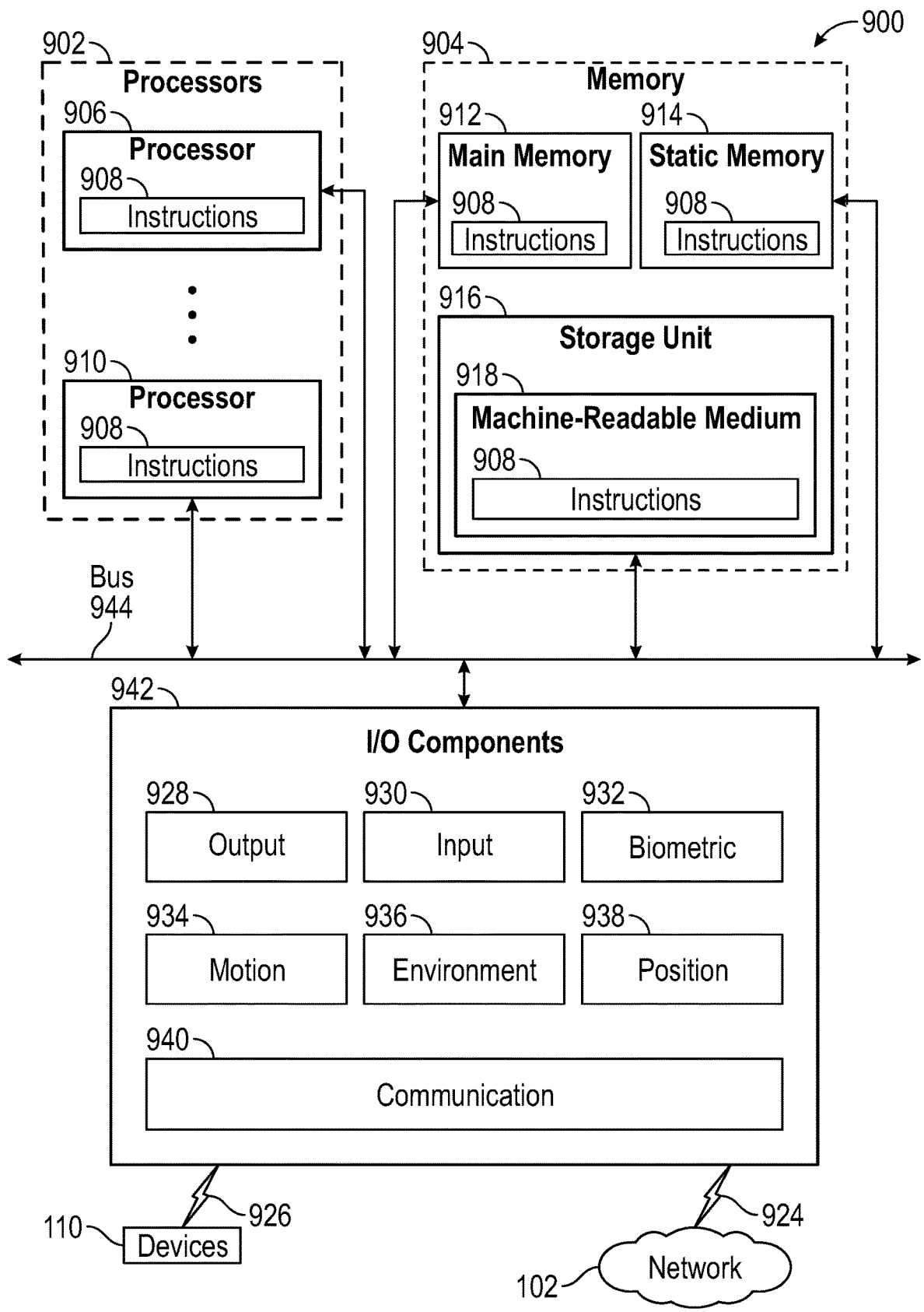
FIG. 9 is a diagrammatic representation of a machine in the form of a computer system within which a set of instructions may be executed for causing the machine to perform any one or more of the methodologies discussed herein, in accordance with some examples.

FIG. 2 is a block diagram illustrating the clustering system 124 operable within server system 108. Clustering system 124 is seen to comprise data structures including a device list 202 associating various client devices 110 to a cluster, and a chart 204 illustrating the performance metrics of each client device 110. The device list 202 and chart 204 are stored in memory 904 (FIG. 9). Devices are scored by applying Principal Component Analysis model to the performance metrics. First component of the model is used to score and rank the devices. Cluster boundaries are formed by first dividing the set into 5 same size group and then adjust based on expert's knowledge on the phone performance. Then cluster centroids are defined based on median values of performance metrics for devices in the same cluster and as new phones come to the market, they get assigned to the cluster that they are most closed to. When a new generation of flagship phones come into the market, which has a lot higher performance than cluster 5 centroids (high performant phones), a new set of clusters are defined to accommodate the new generation of phones.

For example, performance characteristics, in order of importance, can include elapsed time from tapping on the icon until capturing an image/video (cold/warm), camera creation delay (image/video), crash rate, image capture to preview delay, camera recording delay, and lens initiation delay. For latency metrics, the 90 percentile (p90) is selected and data from the first 3 days after launch may be excluded because of performance metric instability.

Figure 3:
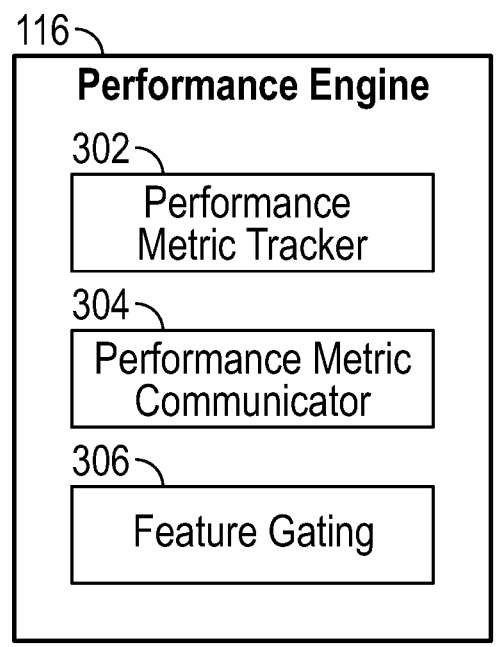
FIG. 3 is a block diagram illustrating the performance engine operable on the client device.

FIG. 3 is a block diagram illustrating the performance engine 116 operable on the client device 110. The performance engine 116 is seen to comprise a performance metric tracker 302 dynamically tracking performance metrics 308 of the client device 110, such as using a MicroKernal, a performance metric communicator 304 using a client device processor/CPU (FIG. 8) communicating the performance metrics 308 to the clustering system 124. Client device 110 also has feature gating 306 that gates the operation of certain features of application 114 as a function of instructions sent by the clustering system 124 processing the performance metrics of client device 110.

Referring to FIG. 4, in an example, device list 202 shows the top 5 client devices in each cluster based on WAU. In another example, a complete list 202 shows all client devices based on a given platform, such as Android and iOS, associated with a cluster.

FIG. 5 illustrates chart 204 showing average performance metrics for client devices 110 of each cluster 0 through 5. Chart 204 illustrates the number of weekly active users (WAU) and the number of weekly new users (WNU). This chart 204 also illustrates client devices 110 that are considered unclassified.

Figure 6:
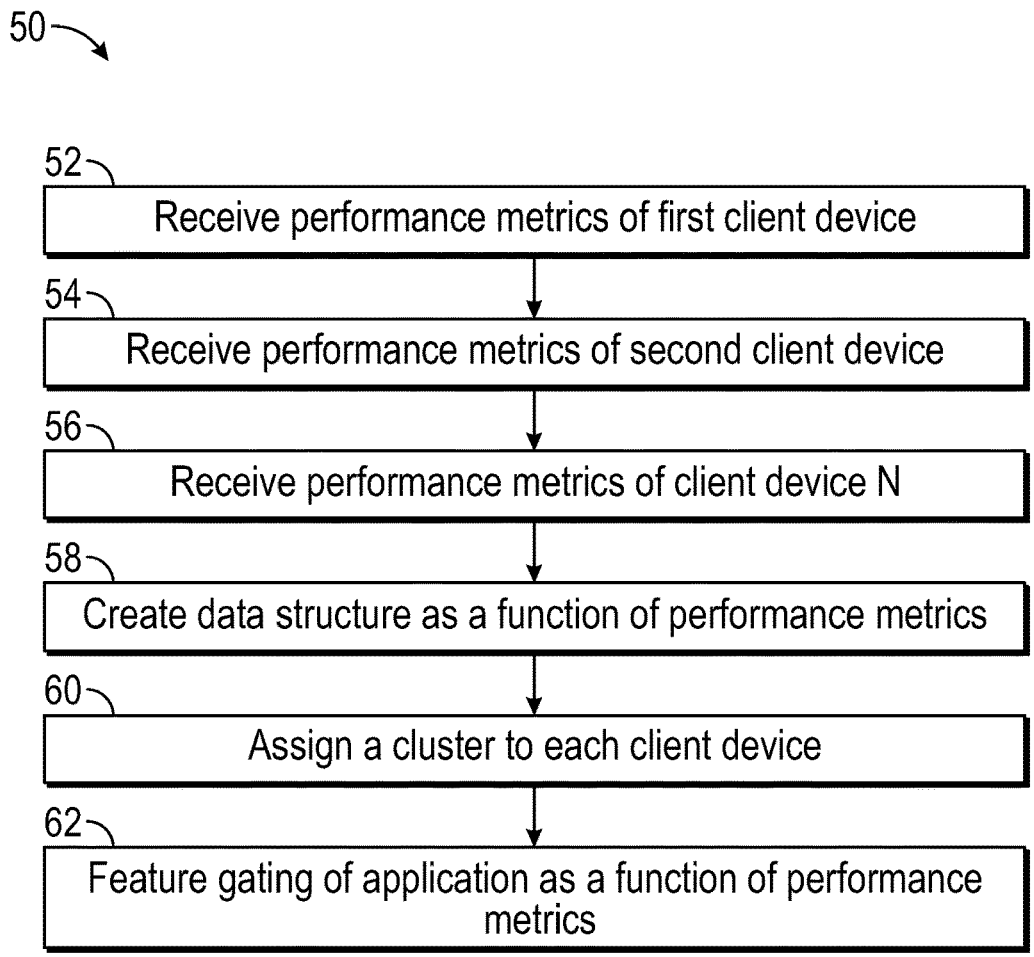
FIG. 6 illustrates an example algorithm of the clustering system executed by instructions running in a processor.

FIG. 6 illustrates an example algorithm 50 of the clustering system 124 executed by instructions 908 running in the processor 902 of server system 108 (FIG. 9).

At block 52, the processor 902 receives performance metrics of a first client device 110 that is running application 114. The performance engine 116 of the first client device 110 dynamically monitors performance metrics of first client device 110 and wirelessly downloads the performance metrics via network 102 to the clustering system 124 operating in server system 108. The performance metrics are stored in memory 904.

At block 54, the processor 902 receives performance metrics of a second client device 110 that is running application 114. The performance engine 116 of the second client device 110 dynamically monitors performance metrics of second client device 110 and wirelessly downloads the performance metrics via network 102 to the clustering system 124 operating in server system 108. The performance metrics are stored in memory 904.

At block 56, this process continues for N client devices running application 114 and reporting performance metrics to the clustering system 124 via network 102. The clustering system 124 stores the performance metrics in memory 904.

At block 58, the downloaded performance metrics from each of the client devices 110 are then processed by the clustering system 124 to create data structures, such as the list shown in FIG. 4 and the chart shown in FIG. 5.

At block 60, the clustering system 124 assigns a cluster to each client device 110 based on its reported performance metrics, as shown in FIG. 4, where the client devices 110 with similar performance metrics are assigned the same cluster. As shown in FIG. 4, the top 5 devices for each cluster are listed. In another example, all client devices 110 are listed along with their assigned cluster. A list for client devices 110 based on the Android® platform are included in a first list, and all client devices 110 based on the iOS® platform are stored in a different second list.

At block 62, the clustering system 124 modifies the operation of the application 114 on certain client devices 110 using feature gating 210 based on the performance metrics. Feature gating 210 ensures a feature is supported on a client device 110, and also that the feature will perform well on the client device 110.

An example use of feature gating of application 114 is turning certain features on and off in clusters. An example is determining a maps feature of the application 114 takes too much power in client devices of clusters 0 and 1. Using a rule, the maps feature of the application 114 is not enabled when using an application on devices of cluster 0 and 1 and remains enabled on devices of clusters 2-5.

The clustering helps understand the effects of features/launches on Android device tiers and iOS tiers, provides a better track of performance metrics, helps focus engineering resources on the right client devices, provide feature gating, and get a more diverse/representative phones for quality assurance (QA).

Example uses of clustering is performing data analysis on feature releases. For instance, when new features are released, the clustering can determine how the feature changes user engagement of the client device. Clustering also helps improve a user experience.

Another example use of clustering is to analyze performance metrics over time, such as a year, and between upgrades.

Figure 7:
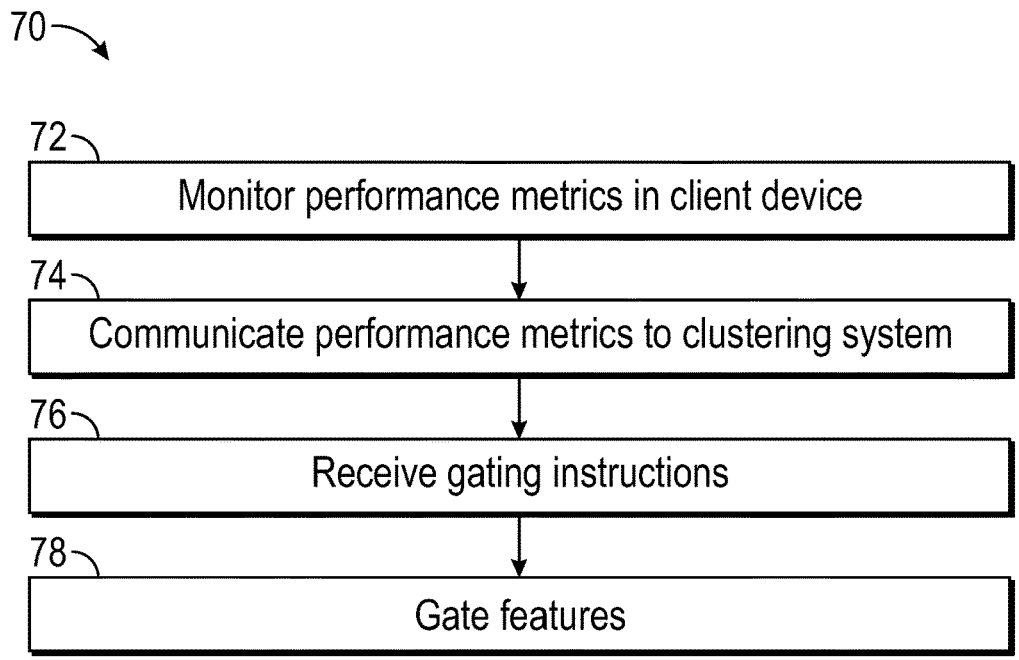
FIG. 7 illustrates an example algorithm of the performance engine.
Figure 8:
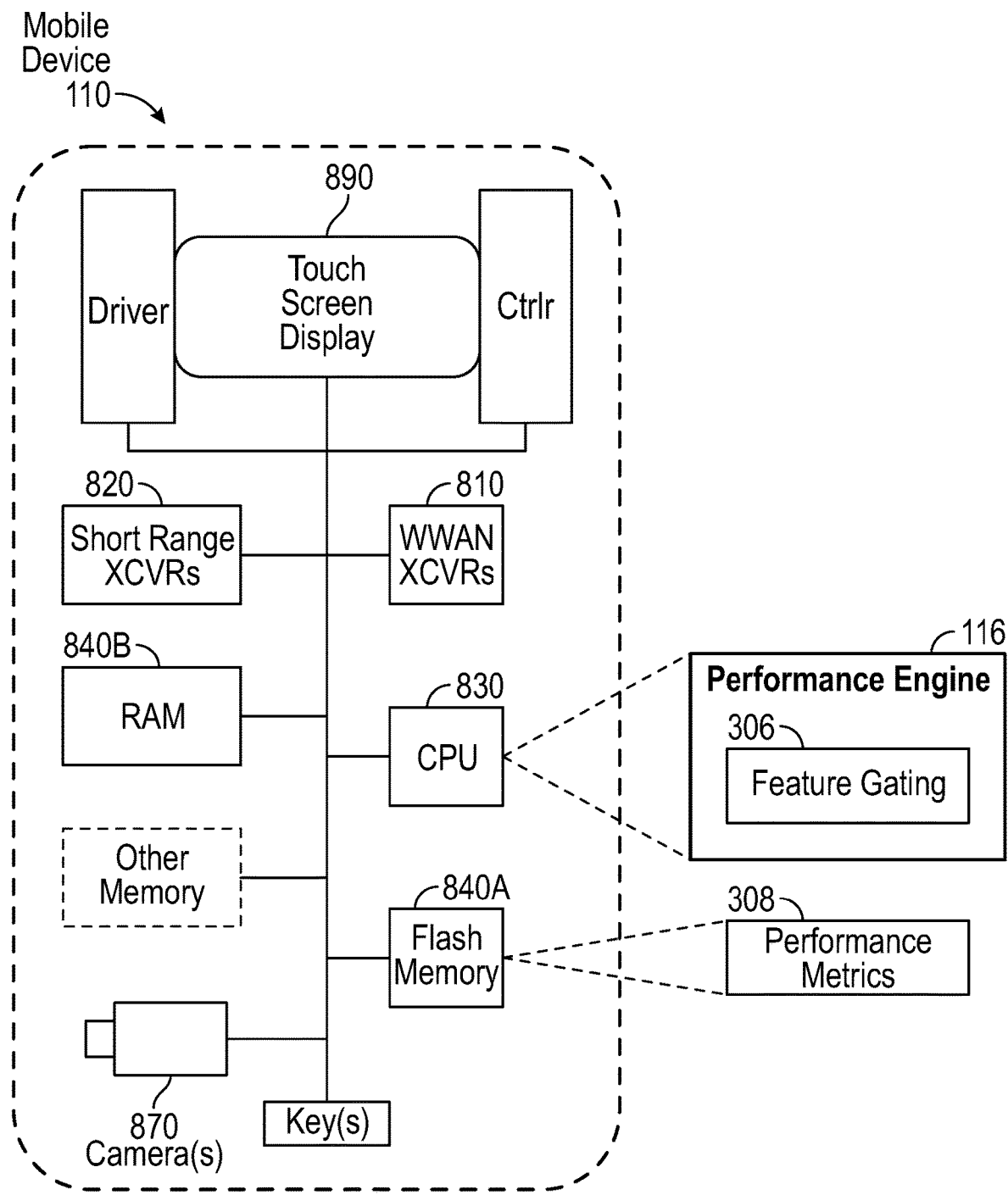
FIG. 8 is a high-level functional block diagram of an example client device comprising a mobile device that communicates via network with server system.

FIG. 7 illustrates an example algorithm 70 of the performance engine 116 executed by instructions running in the processor/central processing unit (CPU) 830 of client device 110 (FIG. 8).

At block 72, the processor 830 of client device 110 monitors performance metrics 308 of client device 110 that is running application 114. The performance engine 116 of the client device 110 dynamically monitors performance metrics 308 of client device 110 and stores them in memory 840A.

At block 74, the processor 830 wirelessly downloads the performance metrics 308 via network 102 to the clustering system 124 operating in server system 108. The processor 830 dynamically downloads the performance metrics 308, such as in real time in one example, and in blocks of data in another example. The clustering system 124 processes the performance metrics as previously described, such as to cluster client devices 110 and create gating instructions for each of the client devices 110.

At block 76, the performance engine 116 receives gating instructions from clustering system 124 via network 102.

At block 78, the client device 110 gates certain features of application 114 as a function of the received gating instructions. An example of gating features is turning certain features on and off in buckets. One example is the clustering system 124 determining a maps feature takes too many resources in client devices 110 of cluster 0 and 1. Using a rule, the maps feature on a client device 110 is not enabled when using application 114 on devices of cluster 0 and 1.

Another example of gating is to aggregate performance metrics to eliminate unique client devices that are usually in the low-power mode.

FIG. 8 is a high-level functional block diagram of an example client device 110 comprising a mobile device that communicates via network 102 with server system 108 of FIG. 9. Shown are elements of a touch screen type mobile device 890 having the performance engine 116, although other non-touch type mobile devices can be used under consideration here. Examples of touch screen type mobile devices that may be used include (but are not limited to) a smart phone, a personal digital assistant (PDA), a tablet computer, a laptop computer, or other portable device. However, the structure and operation of the touch screen type devices is provided by way of example, and the subject technology as described herein is not intended to be limited thereto. For purposes of this discussion, FIG. 8 therefore provides a block diagram illustration of the example mobile device 110 having a touch screen display for displaying content and receiving user input as (or as part of) the user interface. Mobile device 890 also includes a camera(s) 870, such as visible light camera(s).

The activities that are the focus of discussions here involve monitoring and reporting of performance metrics and gating features of application 114 running on the mobile phone 110. As shown in FIG. 8, the mobile device 110 includes at least one digital transceiver (XCVR) 810, shown as WWAN XCVRs, for digital wireless communications via a wide area wireless mobile communication network 102. The mobile device 110 also includes additional digital or analog transceivers, such as short range XCVRs 820 for short-range network communication, such as via NFC, VLC, DECT, ZigBee, Bluetooth™, or WiFi. For example, short range XCVRs 820 may take the form of any available two-way wireless local area network (WLAN) transceiver of a type that is compatible with one or more standard protocols of communication implemented in wireless local area networks, such as one of the Wi-Fi standards under IEEE 802.11 and 4G LTE.

To generate location coordinates for positioning of the mobile device 890, the mobile device 890 can include a global positioning system (GPS) receiver. Alternatively, or additionally the mobile device 110 can utilize either or both the short range XCVRs 820 and WWAN XCVRs 810 for generating location coordinates for positioning. For example, cellular network, WiFi, or Bluetooth™ based positioning systems can generate very accurate location coordinates, particularly when used in combination. Such location coordinates can be transmitted to the eyewear device over one or more network connections via XCVRs 820.

The transceivers 810, 820 (network communication interface) conforms to one or more of the various digital wireless communication standards utilized by modern mobile networks. Examples of WWAN transceivers 810 include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." For example, the transceivers 810, 820 provide two-way wireless communication of information including digitized audio signals, still image and video signals, web page information for display as well as web related inputs, and various types of mobile message communications to/from the mobile device 110 for user identification strategies.

Several of these types of communications through the transceivers 810, 820 and a network, as discussed previously, relate to protocols and procedures in support of communications with the server system 108 for performing performance metric monitoring and gating. Such communications, for example, may transport packet data via the short range XCVRs 820 over the wireless connections of network 102 to and from the server system 108 as shown in FIG. 1. Such communications, for example, may also transport data utilizing IP packet data transport via the WWAN XCVRs 810 over the network (e.g., Internet) 102 shown in FIG. 1. Both WWAN XCVRs 810 and short range XCVRs 820 connect through radio frequency (RF) send-and-receive amplifiers (not shown) to an associated antenna (not shown).

The mobile device 110 further includes a microprocessor 830, shown as a CPU, sometimes referred to herein as the host controller. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU. The processor 830, for example, may be based on any known or available microprocessor architecture, such as a Reduced Instruction Set Computing (RISC) using an ARM architecture, as commonly used today in mobile devices and other portable electronic devices. Of course, other processor circuitry may be used to form the CPU 830 or processor hardware in smartphone, laptop computer, and tablet.

The microprocessor 830 serves as a programmable host controller for the mobile device 110 by configuring the mobile device to perform various operations, for example, in accordance with instructions or programming executable by processor 830. For example, such operations may include various general operations of the mobile device, as well as operations related to performance metric monitoring, reporting to server system 108, and gating. Although a processor may be configured by use of hardwired logic, typical processors in mobile devices are general processing circuits configured by execution of programming.

The mobile device 110 includes a memory or storage device system, for storing data and programming. In the example, the memory system may include a flash memory 840A and a random access memory (RAM) 840B. The RAM 840B serves as short term storage for instructions and data being handled by the processor 830, e.g., as a working data processing memory. The flash memory 840A typically provides longer term storage.

Hence, in the example of mobile device 110, the flash memory 840A is used to store programming or instructions for execution by the processor 830. Depending on the type of device, the mobile device 110 stores and runs a mobile operating system through which specific applications, including application 114. Applications, such as the performance metric monitoring and gating, may be a native application, a hybrid application, or a web application (e.g., a dynamic web page executed by a web browser) that runs on mobile device 890 to uniquely identify the user. Examples of mobile operating systems include Google Android®, Apple iOS® (I-Phone or iPad devices), Windows Mobile®, Amazon Fire OS®, RIM BlackBerry® operating system, or the like.

As shown, flash memory 840A storage device stores a database of performance metrics 308. The database of performance metrics 308 is accumulated over time as different a user runs application 114. The flash memory 840A also stores gating information of the client device 110, including which features are enabled and unenabled based on the performance metrics.

FIG. 9 is a diagrammatic representation of the machine 900 within which instructions 908 (e.g., software, a program, an application, an applet, an app, or other executable code) for causing the machine 900 to perform any one or more of the methodologies discussed herein may be executed. For example, the instructions 908 may cause the machine 900 to execute any one or more of the methods described herein. The instructions 908 transform the general, non-programmed machine 900 into a particular machine 900 programmed to carry out the described and illustrated functions in the manner described. The machine 900 may operate as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 908, sequentially or otherwise, that specify actions to be taken by the machine 900. Further, while only a single machine 900 is illustrated, the term "machine" shall also be taken to include a collection of machines that individually or jointly execute the instructions 908 to perform any one or more of the methodologies discussed herein.

The machine 900 may include processors 902, memory 904, and I/O components 942, which may be configured to communicate with each other via a bus 944. In an example, the processors 902 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 906 and a processor 910 that execute the instructions 908. The term "processor" is intended to include multi-core processors that may comprise two or more independent processors (sometimes referred to as "cores") that may execute instructions contemporaneously. Although FIG. 9 shows multiple processors 902, the machine 900 may include a single processor with a single core, a single processor with multiple cores (e.g., a multi-core processor), multiple processors with a single core, multiple processors with multiples cores, or any combination thereof.

The memory 904 includes a main memory 912, a static memory 914, and a storage unit 916, both accessible to the processors 902 via the bus 944. The main memory 904, the static memory 914, and storage unit 916 store the instructions 908 embodying any one or more of the methodologies or functions described herein. The instructions 908 may also reside, completely or partially, within the main memory 912, within the static memory 914, within machine-readable medium 918 (e.g., a non-transitory machine-readable storage medium) within the storage unit 916, within at least one of the processors 902 (e.g., within the processor's cache memory), or any suitable combination thereof, during execution thereof by the machine 900.

Furthermore, the machine-readable medium 918 is non-transitory (in other words, not having any transitory signals) in that it does not embody a propagating signal. However, labeling the machine-readable medium 918 "non-transitory" should not be construed to mean that the medium is incapable of movement; the medium should be considered as being transportable from one physical location to another. Additionally, since the machine-readable medium 918 is tangible, the medium may be a machine-readable device.

The I/O components 942 may include a wide variety of components to receive input, provide output, produce output, transmit information, exchange information, capture measurements, and so on. The specific I/O components 942 that are included in a particular machine will depend on the type of machine. For example, portable machines such as mobile phones may include a touch input device or other such input mechanisms, while a headless server machine will likely not include such a touch input device. It will be appreciated that the I/O components 942 may include many other components that are not shown in FIG. 9. In various examples, the I/O components 942 may include output components 928 and input components 930. The output components 928 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 930 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location, force of touches or touch gestures, or other tactile input components), audio input components (e.g., a microphone), and the like.

In further examples, the I/O components 942 may include biometric components 932, motion components 934, environmental components 936, or position components 938, among a wide array of other components. For example, the biometric components 932 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 934 include acceleration sensor components (e.g., accelerometer), gravitation sensor components, rotation sensor components (e.g., gyroscope), and so forth. The environmental components 936 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 938 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 942 further include communication components 940 operable to couple the machine 900 to network 102 and client devices 110 via a coupling 924 and a coupling 926, respectively. For example, the communication components 940 may include a network interface component or another suitable device to interface with the network 102. In further examples, the communication components 940 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 110 may be another machine or any of a wide variety of peripheral devices (e.g., a peripheral device coupled via a USB).

Moreover, the communication components 940 may detect identifiers or include components operable to detect identifiers. For example, the communication components 940 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 940, such as location via Internet Protocol (IP) geolocation, location via Wi-Fi® signal triangulation, location via detecting an NFC beacon signal that may indicate a particular location, and so forth.

The various memories (e.g., memory 904, main memory 912, static memory 914, memory of the processors 902), storage unit 916 may store one or more sets of instructions and data structures (e.g., software) embodying or used by any one or more of the methodologies or functions described herein. These instructions (e.g., the instructions 908), when executed by processors 902, cause various operations to implement the disclosed examples.

The instructions 908 may be transmitted or received over the network 102, using a transmission medium, via a network interface device (e.g., a network interface component included in the communication components 940) and using any one of a number of well-known transfer protocols (e.g., hypertext transfer protocol (HTTP)). Similarly, the instructions 908 may be transmitted or received using a transmission medium via the coupling 926 (e.g., a peer-to-peer coupling) to the devices 110.

Figure 10:
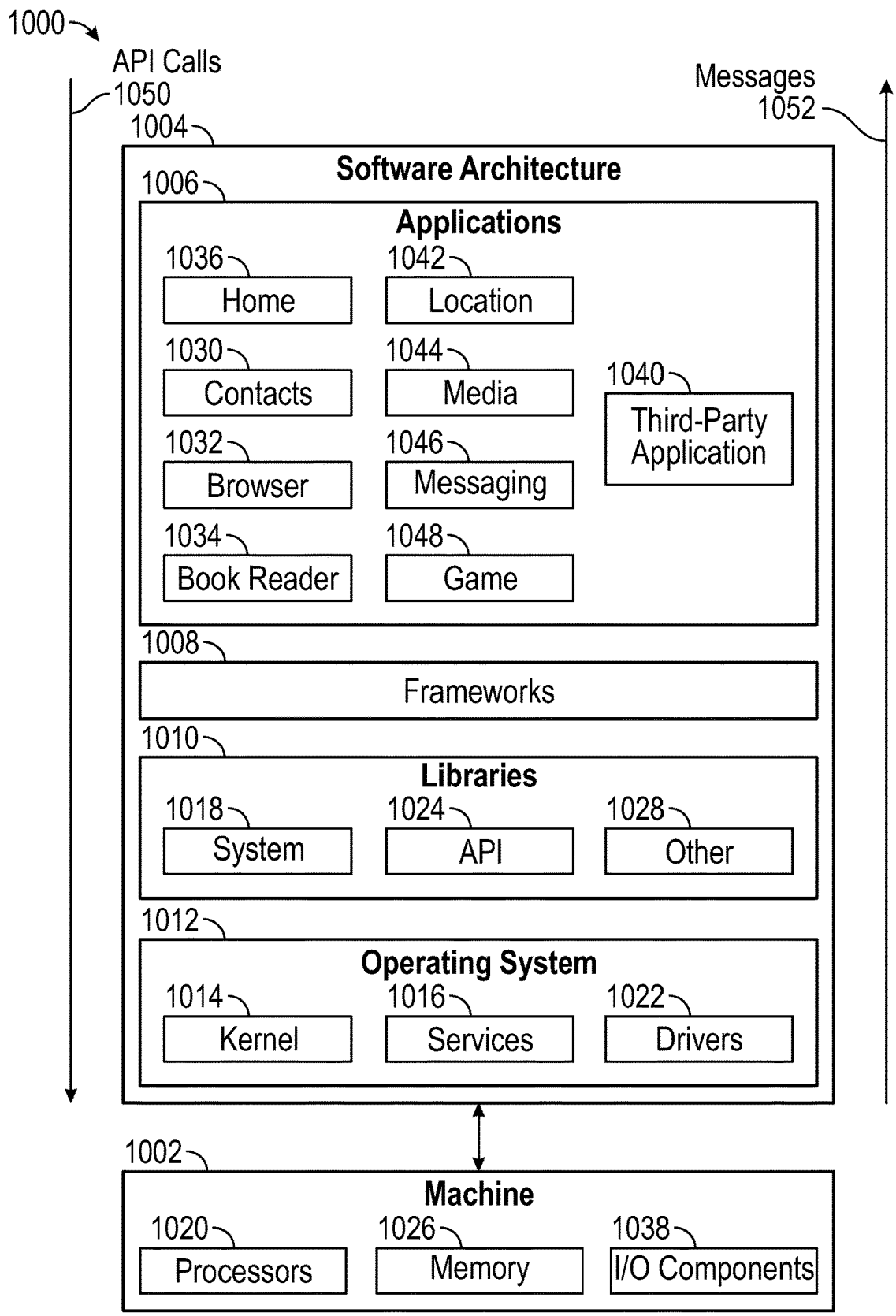
FIG. 10 is block diagram showing a software architecture within which the present disclosure may be implemented, in accordance with examples.

FIG. 10 is a block diagram 1000 illustrating a software architecture 1004, which can be installed on any one or more of the devices described herein. The software architecture 1004 is supported by hardware such as a machine 1002 that includes processors 1020, memory 1026, and I/O components 1038. In this example, the software architecture 1004 can be conceptualized as a stack of layers, where each layer provides a particular functionality. The software architecture 1004 includes layers such as an operating system 1012, libraries 1010, frameworks 1008, and applications 1006. Operationally, the applications 1006 invoke API calls 1050 through the software stack and receive messages 1052 in response to the API calls 1050.

The operating system 1012 manages hardware resources and provides common services. The operating system 1012 includes, for example, a kernel 1014, services 1016, and drivers 1022. The kernel 1014 acts as an abstraction layer between the hardware and the other software layers. For example, the kernel 1014 provides memory management, processor management (e.g., scheduling), component management, networking, and security settings, among other functionality. The services 1016 can provide other common services for the other software layers. The drivers 1022 are responsible for controlling or interfacing with the underlying hardware. For instance, the drivers 1022 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 1010 provide a low-level common infrastructure used by the applications 1006. The libraries 1010 can include system libraries 1018 (e.g., C standard library) that provide functions such as memory allocation functions, string manipulation functions, mathematic functions, and the like. In addition, the libraries 1010 can include API libraries 1024 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1010 can also include a wide variety of other libraries 1028 to provide many other APIs to the applications 1006.

The frameworks 1008 provide a high-level common infrastructure that is used by the applications 1006. For example, the frameworks 1008 provide various graphical user interface (GUI) functions, high-level resource management, and high-level location services. The frameworks 1008 can provide a broad spectrum of other APIs that can be used by the applications 1006, some of which may be specific to a particular operating system or platform.

In an example, the applications 1006 may include a home application 1036, a contacts application 1030, a browser application 1032, a book reader application 1034, a location application 1042, a media application 1044, a messaging application 1046, a game application 1048, and a broad assortment of other applications such as a third-party application 1040. The e applications 1006 are programs that execute functions defined in the programs. Various programming languages can be employed to create one or more of the applications 1006, structured in a variety of manners, such as object-oriented programming languages (e.g., Objective-C, Java, or C++) or procedural programming languages (e.g., C or assembly language). In a specific example, the third-party application 1040 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1040 can invoke the API calls 1050 provided by the operating system 1012 to facilitate functionality described herein.

The terms and expressions used herein are understood to have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

The examples illustrated herein are described in sufficient detail to enable those skilled in the art to practice the teachings disclosed. Other examples may be used and derived therefrom, such that structural and logical substitutions and changes may be made without departing from the scope of this disclosure. The Detailed Description, therefore, is not to be taken in a limiting sense, and the scope of various examples is defined only by the appended claims, along with the full range of equivalents to which such claims are entitled.

What is claimed is:

1. A method, comprising:
receiving, by a processor, performance metrics from mobile devices running an application having a feature;
aggregating, by the processor, the received performance metrics as a function of the mobile devices and their associated performance metrics;
clustering, by the processor, the mobile devices having an attribute such that the mobile devices are each assigned to a cluster, wherein the attribute is comprised of an operating platform or a type of mobile device, wherein the mobile devices having similar performance metrics and a common said attribute are assigned to the same cluster, wherein a first said cluster includes the mobile devices with the lowest performance metrics, a third said cluster includes the mobile devices with the best performance metrics, and a second said cluster includes the mobile devices with performance metrics between that of the first cluster and the third cluster of mobile devices;
storing in a data table the assigned clusters, and the similar performance metrics of the mobile devices; and
modifying, by the processor, an operation of the application based on the data table by modifying operation of one or more features of the application as a function of the cluster the mobile devices are assigned, wherein the processor causes the mobile devices to gate an operation of the feature of the application without closing the application depending on which cluster the mobile device is assigned such that only mobile devices that can support the feature can operate the feature.

2. The method of claim 1, wherein the clustering is dynamically updated.

3. The method of claim 1, wherein the performance metrics of the mobile devices are a function of running the feature.

4. The method of claim 1, wherein the mobile devices have an attribute, and the mobile devices are clustered based on the attribute.

5. The method of claim 4, wherein the attribute is comprised of an operating platform or a type of mobile device.

6. The method of claim 4, wherein the attribute is a model of the mobile devices.

7. The method of claim 1, wherein a first group of the mobile devices having similar performance metrics and a first attribute is assigned a first cluster, wherein a second group of the mobile devices having similar performance metrics and a second attribute is assigned a second cluster, and wherein a third group of the mobile devices having similar performance metrics and a third attribute is assigned a third cluster.

8. The method of claim 1, wherein the processor instructs the mobile devices to gate an operation of the feature without closing the application.

9. The method of claim 1, wherein the data table comprises average performance metrics of the mobile devices assigned the same cluster.

10. A system, comprising:
a memory that stores instructions; and
a processor that executes the instructions to perform operations comprising:
receiving performance metrics from mobile devices running an application having a feature;
aggregating the received performance metrics as a function of the mobile devices and their associated performance metrics;
clustering the mobile devices having an attribute such that the mobile devices are each assigned to a cluster, wherein the mobile devices having similar performance metrics and a common said attribute are assigned to the same cluster, wherein the attribute is comprised of an operating platform or a type of mobile device, wherein a first said cluster includes the mobile devices with the lowest performance metrics, a third said cluster includes the mobile devices with the best performance metrics, and a second said cluster includes the mobile devices with performance metrics between that of the first cluster and the third cluster of mobile devices;

storing in a data table the assigned clusters, and the similar performance metrics of the mobile devices; and modifying an operation of the application based on the data table by modifying operation of one or more features of the application as a function of the cluster the mobile devices are assigned, wherein the processor causes the mobile devices to gate an operation of the feature of the application without closing the application depending on which cluster the mobile device is assigned such that only mobile devices that can support the feature can operate the feature.

11. The system of claim 10, wherein the clustering is dynamically updated.

12. The system of claim 10, wherein the performance metrics of the mobile devices are a function of running the feature.

13. The system of claim 10, wherein the mobile devices have an attribute, and the mobile devices are clustered based on the attribute.

14. The system of claim 13, wherein the attribute is comprised of an operating platform or a type of mobile device.

15. The system of claim 10, wherein the processor is configured to instruct the mobile devices to gate an operation of the feature without closing the application.

16. The system of claim 10, wherein the data table comprises average performance metrics of the mobile devices assigned the same cluster.

17. A non-transitory processor-readable storage medium storing processor-executable instructions that, when executed by a processor of a machine, cause the processor to perform operations comprising:

receiving performance metrics from mobile devices running an application having a feature;

aggregating the received performance metrics as a function of the mobile devices and their associated performance metrics;

clustering the mobile devices having an attribute such that the mobile devices are each assigned to a cluster, wherein the mobile devices having similar performance metrics and a common said attribute are assigned to the same cluster, wherein the attribute is comprised of an operating platform or a type of mobile device, wherein a first said cluster includes the mobile devices with the lowest performance metrics, a third said cluster includes the mobile devices with the best performance metrics, and a second said cluster includes the mobile devices with performance metrics between that of the first cluster and the third cluster of mobile devices;

storing in a data table the assigned clusters, and the similar performance metrics of the mobile devices; and modifying an operation of the application based on the data table by modifying operation of one or more features of the application as a function of the cluster the mobile devices are assigned, wherein the processor causes the mobile devices to gate an operation of the feature of the application without closing the application depending on which cluster the mobile device is assigned such that only mobile devices that can support the feature can operate the feature.

18. The non-transitory processor-readable storage medium of claim 17, wherein the instructions cause the processor to perform an operation to dynamically update the clusters.

19. The non-transitory processor-readable storage medium of claim 17, wherein the performance metrics of the mobile devices are a function of running the feature.

* * * * *